United States Patent
Tauern

[11] 3,832,515
[45] Aug. 27, 1974

[54] WELDING GUN FOR CONDENSER DISCHARGE BOLT WELDING

[75] Inventor: Dankmar Tauern, Triesenberg, Germany

[73] Assignee: Hilti Aktiengesellschaft, Schaan, Fuerstentum, Liechtenstein

[22] Filed: July 6, 1973

[21] Appl. No.: 377,011

[30] Foreign Application Priority Data
July 7, 1972  Germany.............................. 2233609

[52] U.S. Cl. ................................................. 219/98
[51] Int. Cl. ............................................ B23k 9/20
[58] Field of Search................................ 219/98, 99

[56] References Cited
UNITED STATES PATENTS

| | | | |
|---|---|---|---|
| 2,413,189 | 12/1946 | Nelson.................................. | 219/98 |
| 2,870,322 | 1/1959 | Jones.................................... | 219/98 |
| 3,445,619 | 5/1969 | Kelemen................................ | 219/98 |

Primary Examiner—J. V. Truhe
Assistant Examiner—Clifford C. Shaw
Attorney, Agent, or Firm—Toren, McGeady and Stanger

[57] ABSTRACT

In a bolt welding gun for condenser discharge bolt welding, a bolt holder is axially displaceable within the gun housing and is secured in position ready to weld a bolt by a magnet device located in the housing. The magnet device consists of two parts and one is mounted on the bolt holder and is axially displaceable relative to it. A compression spring drives the bolt holder toward the receiving material when the magnet device is de-activated. When the movement of the bolt holder toward the receiving material is stopped, the magnet part mounted on it continues to move in the direction of the bolt. A spring is provided on the bolt holder and contacts the magnet part mounted on it so that, as the magnet part moves relative to the bolt holder, the spring provides a damping effect on the magnet part.

7 Claims, 1 Drawing Figure

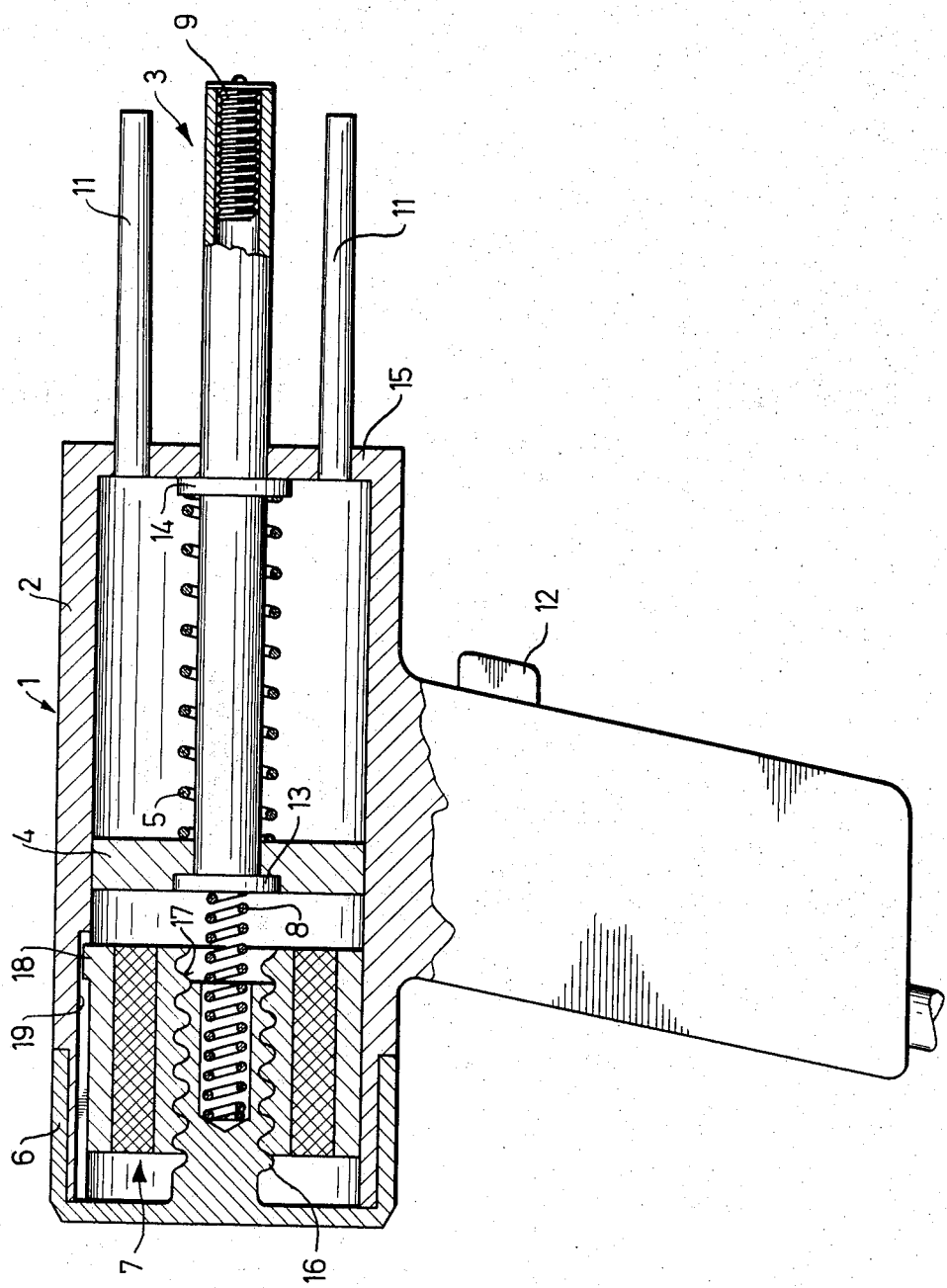

WELDING GUN FOR CONDENSER DISCHARGE BOLT WELDING

SUMMARY OF THE INVENTION

The present invention is directed to a welding gun for condenser discharge bolt welding and, more particularly, it concerns an axially displaceable bolt holder and a magnet device including a magnet armature which is mounted on the bolt holder and is displaceable axially relative to it. In the present invention a magnet device, consisting of a magnet coil positioned within the gun housing and the magnet armature on the bolt holder, secure the bolt holder in position ready for the welding operation. The bolt holder is driven against the receiving or target material by a force which is less than the holding force exerted by the magnet device. A current source actuates the electromagnet of the magnet device and a switching element is provided on the welding gun housing for opening and closing the electromagnet circuit.

In condenser discharge bolt welding, the bolt is fed to the welding position from a location where its front end is spaced from the receiving material so that arcing can take place. The required spacing is obtained, for example, by a tip positioned on the leading end face of the bolt for facilitating the ignition of the arc. Prior to the welding action, the tip contacts the melting position before the melting phase commences and melts during the arcing. Since the tip is not necessary in all cases for the ignition of the arc, it is possible to hold the bolt by means arranged on the welding gun at a greater distance from the receiving or target material. However, the rate of feed must be very high, since the bolts must be fed during the arcing step which lasts only a few milliseconds, and, further, the bolt must be dipped into the melt under the action of a certain force which can be provided by the kinetic energy of the bolt and of the bolt holder.

When the bolt strikes the welding position at a high velocity, with presently known welding guns the bolt tends to bounce back from the solidifying melt, due to the kinetic energy of the moving bolt and of the bolt holder plus the parts associated with it. As a result, the bolts are inadequately secured to the receiving material.

The bouncing effect depends on the extent of the kinetic energy, which, in turn, is determined by the mass and velocity of the parts involved in the feeding operation. However, both the mass and velocity must have adequate values to ensure the exertion of sufficient force to direct the bolt into the welding bath for assuring the quality of the welding attachment of the bolt to the receiving material.

The primary object of the present invention is to provide a bolt welding gun which eliminates the harmful bouncing effect of the bolt at the necessary feeding rate for adequately securing the bolt to the receiving material.

Therefore, in accordance with the present invention, a magnet device is used which includes one magnet part associated with the bolt holder and arranged for movement relative to the bolt holder. Formed on the bolt holder are a driver at its rearward end for limiting the rearward position of the one magnet part and a stop located forwardly of the driver on the bolt holder for limiting the movement of the displaceable magnet part in the direction in which it is fed toward the receiving material.

When the bolt strikes the welding position on the receiving material, the bolt holder is stopped abruptly at the same time along with the bolt. Though the bolt holder has stopped, the magnet part mounted on it along with any additional axially moving parts continue to move in the feeding direction without increasing the bouncing effect due to their kinetic energy. Thus it is possible to minimize the bouncing effect by separating or uncoupling the masses associated with the bolt holder and without impairing the required feeding rate and force for driving the bolt into the welding position on the receiving material.

Preferably, the magnet part associated with the bolt holder is an armature, since the relatively delicate magnet coil, as well as its connecting wires, are not moved and stopped abruptly during the welding process and can be incorporated into the welding gun housing without any difficulty.

Another feature of the invention is the use of a damping element located between the magnet part mounted on the bolt holder and a stop located on the bolt holder forwardly of the magnet part. This arrangement has the effect that a force counteracting the bouncing is continuously developed. By the proper arrangement of the damping element it is possible to eliminate completely the bouncing effect.

Therefore, the various parts cooperating in directing the bolt against the target or receiving material are protected in the present invention so that the life expectancy of the welding gun is increased.

Preferably, the damping element is formed of elastic material or is itself an elastic member. However, an air cushion arranged between the bolt holder and its associated magnet part can also be used as the damping element.

Compression springs which bias the magnet part on the holder element in the direction of its rearward or driving end are particularly suitable for use as damping elements. In such an arrangement, the magnet part is biased in the rearward direction relative to the bolt holder, even when the welding gun is directed downwardly in the working position.

To provide a support for the forward end of the elastic damping element and, at the same time, to prevent the bolt holder from being driven outwardly from the welding gun housing, a stop is formed on the holder in the form of a ring flange against which the forward end of the damping element seats.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The drawing is a side elevation view, partly in section, of a welding gun embodying the present invention and illustrated in the rest position.

DETAILED DESCRIPTION OF THE INVENTION

In the drawing a welding gun 1 consists of a housing 2 forming an axially extending passage through which a bolt holder 3 is positionable. The forward end of the bolt holder 3 extends axially outwardly from the housing 2 and supports a bolt 9 in position for attachment to a receiving material or surface, not shown. Within the housing 2, an armature 4 is located at the rearward end of the bolt holder 3. The portion of the bolt holder 3 located within the housing has a driver 13 at its rearward end, shown in contact with the armature 4 and a stop 14 at its forward end in contact with the interior surface of the forward end of the housing 2. Extending between the armature 4 and the stop 14 is a damping spring 5.

A screw cap 6 is mounted on the rearward end of the housing 2 and a threaded shaft or pin 16 extends axially from the screw cap into the passage within the housing 2. A magnet coil 7 is located within the housing 2 and laterally encloses the threaded shaft 16. The threaded shaft 16 has a blind bore in its end facing the forward end of the welding gun and a compression spring 8 is seated within the blind bore and extends forwardly into contact with the rear face of the driver 13.

As shown in the drawing, the circuit of the magnet coil 7 is closed. If the bolt holder 3 together with a bolt 9, the associated damping spring 5 and attraction armature 4 is pushed manually in the rearward direction, the magnetic field attracts the armature 4 and keeps it in contact with the magnetic coil 7. The compression spring 8 is prestressed due to the rearward movement of the assembly and the force exerted by the spring on the bolt holder is less than the force of attraction developed by the magnet coil. The spring is compressed by the amount of the stroke or rearward movement of the bolt holder and preferably the stroke is greater than the amounl by which the bolt projects forwardly of supporting legs 11 which extend outwardly from the front end of the housing.

When the supporting legs 11 of the welding gun 1 are pressed against the receiving material and the magnetic circuit is opened by operating a control button 12, the force of sttraction between the coil 7 and the armature 4 is released and the spring 8 drives the bolt holder 3 toward the receiving material. The bolt 9 strikes the welding position and stops the forward movement of both the bolt holder 3 and the damping spring 5. However, the armature 4 is carried along with the bolt holder 3 by means of the driver 13 and continues to move in the direction of the receiving material even though the bolt holder 3 stops, and is stopped by the damping spring 5 which bears at its forward end against the stop 14. This stopping action causes a force impulse in the direction of movement of the bolt toward the receiving material which reduces the bounce of the parts striking the welding position and, at the same time, acts opposite to the direction of movement toward the receiving material. Accordingly, the displacement of the bolt from the welding pool, otherwise caused by the bouncing action, is prevented. The stop 14 supports the bolt holder 3 in the rest position against the forward end 15 of the housing and prevents the bolt holder from being displaced axially forwardly from the welding gun 1.

To vary the stroke of the magnet parts from the rest position into the position ready for effecting a welding operation, the screw cap 6 can be rotated relative to the housing and its axially extending threaded shaft 16 engages a juxtaposed thread 17 formed on the magnet coil 7. To effect an axial displacement of the magnet coil when the screw cap 6 is turned, the magnet coil 7 is secured against rotation by a finger 18 which is engaged within an axial slot 19 formed in the inner surface of the housing 2.

It is also possible to assemble several welding guns formed in accordance with the present invention as a unit so that considerable advantages can be achieved in series assemblies in a stationary operation.

While a specific embodiment of the invention has been shown and described in detail to illustrate the application of the inventive principles, it will be understood that the invention may be embodied otherwise without departing from such principles.

What is claimed is:

1. Bolt welding gun for condenser discharge bolt welding, comprising a housing forming an axially extending passage with a forward end and a rearward end, a bolt holder axially movably supported within the passage in said housing and being axially displaceable within the passage between an arcing position and a welding position located forwardly of the arcing position relative to the forward direction of the passage in said housing, a magnet device comprising a first magnet part operatively associated with said bolt holder and displaceable therewith and a second magnet part mounted in said housing, said magnet device arranged when actuated to provide an attractive force between said first and second magnet parts and to hold said bolt holder in the arcing position, means within said housing for driving said bolt holder in the direction of the forward welding position when the attractive force between said first and second magnet parts is released, said magnet device exerting an attractive holding force between said first and second magnet parts which is greater than the driving force of said driving means, wherein the improvement comprises that said first magnet part is mounted on and is movably displaceable relative to said bolt holder so that the forward movement of said first magnet part can continue after said bolt holder has been stopped in the welding position, said bolt holder having a driver in contact with said driving means and arranged to limit the movement of said first magnet part in the rearward direction along said bolt holder, and a stop located within said housing and spaced forwardly of said driver in the axial direction of said bolt holder for limiting the forward movement of said first magnet part relative to said bolt holder after said bolt holder has been driven forwardly by said driving means and stopped in the welding position.

2. Bolt welding gun, as set forth in claim 1, wherein said first magnet part mounted on said bolt holder is an armature.

3. Bolt welding gun, as set forth in claim 2, wherein a damping element is positioned between said first magnet part and said stop for affording a damping effect on said first magnet part as it moves forwardly relative to said bolt holder.

4. Bolt welding gun, as set forth in claim 3, wherein said damping element is a resilient member.

5. Bolt welding gun, as set forth in claim 3, wherein said damping element is a compression spring.

6. Bolt welding gun, as set forth in claim 3, wherein said stop is a ring-shaped flange secured to and extending radially outwardly from said bolt holder and said stop being arranged to cooperate with the forward portion of said housing in stopping the movement of said bolt holder into the welding position.

7. Bolt welding gun, as set forth in claim 3, wherein said bolt holder has a rearward part located within said housing and a forward part extending axially outwardly from the forward end of said housing, said stop located adjacent the forward end of the rearward part of said bolt holder and said driver located at the rearward end of the rearward part of said bolt holder, said first magnet part mounted on said bolt driver, said damping element comprises a spring extending between said first magnet part and said stop and normally biasing said first magnet part in the rearward direction against said driver, a screw cap mounted on the rearward end of said housing, and said means for driving said bolt holder comprises a compression spring having its forward end in contact with the rearward end of said bolt holder and its rearward end seated against said screw cap.

* * * * *

UNITED STATES PATENT OFFICE
CERTIFICATE OF CORRECTION

Patent No. 3,832,515     Dated August 27, 1974

Inventor(s) Dankmar Tauern

It is certified that error appears in the above-identified patent and that said Letters Patent are hereby corrected as shown below:

In the Heading of the Patent:

The inventor's address should read:

--Triesenberg, Liechtenstein--.

The assignee's address should read:

--Schaan, Fuerstentum Liechtenstein--.

Signed and sealed this 19th day of November 1974.

(SEAL)
Attest:

McCOY M. GIBSON JR.
Attesting Officer

C. MARSHALL DANN
Commissioner of Patents